United States Patent
Admati et al.

(10) Patent No.: US 9,787,066 B2
(45) Date of Patent: Oct. 10, 2017

(54) METHODS AND ARRANGEMENTS FOR ATTENUATING MAGNETIC FIELDS OF ELECTRICAL CABINETS

(71) Applicant: Green ELMF Cables Ltd., Haifa (IL)

(72) Inventors: Ehud Admati, Haifa (IL); Ran Sagiv, Haifa (IL); Shalom Green, Haifa (IL)

(73) Assignee: GREEN ELMF CABLES LTD., Haifa (IL)

( * ) Notice: Subject to any disclaimer, the term of this patent is extended or adjusted under 35 U.S.C. 154(b) by 0 days.

(21) Appl. No.: 14/439,823

(22) PCT Filed: Oct. 30, 2013

(86) PCT No.: PCT/IL2013/050886
§ 371 (c)(1),
(2) Date: Apr. 30, 2015

(87) PCT Pub. No.: WO2014/068562
PCT Pub. Date: May 8, 2014

(65) Prior Publication Data
US 2015/0303659 A1    Oct. 22, 2015

(30) Foreign Application Priority Data

Nov. 1, 2012   (IL) .......................................... 222794
Jan. 29, 2013  (IL) .......................................... 224455

(51) Int. Cl.
*H02B 1/20*   (2006.01)
*H02G 5/02*   (2006.01)

(52) U.S. Cl.
CPC .............. *H02B 1/20* (2013.01); *H02G 5/025* (2013.01)

(58) Field of Classification Search
CPC .............. H02B 1/20–1/21; H02G 5/06; H02G 5/02–5/025
See application file for complete search history.

(56) References Cited

U.S. PATENT DOCUMENTS 2,287,502 A * 6/1942 Togesen .................. H02G 5/06
                                                    174/68.2
2,365,514 A * 12/1944 Bosch ...................... H02J 3/04
                                                    307/112

(Continued)

FOREIGN PATENT DOCUMENTS

CN          201584664 U      9/2010
CN          202111374 U      1/2012

(Continued)

*Primary Examiner* — Robert J Hoffberg
(74) *Attorney, Agent, or Firm* — Browdy and Neimark, PLLC

(57) ABSTRACT

A bus-bar system usable for electrical cabinets for distributing electrical power supplied by an electrical supply cable comprising two or more electrically conducting wires. In some embodiments the bus-bar system comprises a predetermined number of bus-bar elements each electrically connectable to at least one of the wires of the electrical supply cable. At least one of the bus-bar elements may be formed by a group of at least two sub-bus-bar elements electrically connectable to each other in parallel. Each group of the sub-bus-bar elements may be electrically connectable to at least one of the wires of the electrical supply cable, where each of said bus-bar and sub-bus-bar elements being located adjacent at least one other bus-bar or sub-bus-bar element associated with either different electrical phase or different electrical current direction to thereby cause magnetic fields emanating from said bus-bar and sub-bus-bar elements to destructively interfere with each other.

21 Claims, 9 Drawing Sheets

(56) References Cited

U.S. PATENT DOCUMENTS

| | | | | |
|---|---|---|---|---|
| 2,372,267 | A * | 3/1945 | Frank | H02G 5/06 174/99 B |
| 2,441,485 | A * | 5/1948 | Graves, Jr. | H02B 1/21 361/631 |
| 2,862,117 | A * | 11/1958 | Rowe | H02G 5/06 174/68.2 |
| 2,884,547 | A * | 4/1959 | Herrmann | H02G 5/06 307/147 |
| 2,884,548 | A * | 4/1959 | Scott, Jr. | H02G 5/06 307/147 |
| 2,912,603 | A * | 11/1959 | Farnsworth | H02G 5/06 174/88 B |
| 2,942,225 | A * | 6/1960 | Ricci | H01B 17/26 174/99 B |
| 2,945,137 | A * | 7/1960 | Farnsworth | H02G 5/06 174/129 B |
| 2,946,034 | A * | 7/1960 | Washburn | H02G 5/06 174/99 B |
| 2,955,147 | A * | 10/1960 | Carlson | H02G 5/06 174/68.2 |
| 2,966,540 | A * | 12/1960 | Christensen | H02G 5/06 174/72 B |
| 2,966,542 | A * | 12/1960 | Shields | H02G 5/06 174/72 B |
| 2,968,781 | A * | 1/1961 | Staskowski | H02G 5/08 174/99 B |
| 2,997,523 | A * | 8/1961 | Weimer | H02G 5/06 174/68.2 |
| 3,003,021 | A * | 10/1961 | Christensen | H02G 5/06 174/99 B |
| 3,044,036 | A * | 7/1962 | Herrmann | H02G 5/06 174/99 B |
| 3,125,628 | A * | 3/1964 | Fisher | H02G 5/06 174/16.2 |
| 3,140,345 | A * | 7/1964 | Kuhar | H02G 5/06 174/99 B |
| 3,147,389 | A * | 9/1964 | Carlson | H02G 5/061 174/396 |
| 3,178,668 | A * | 4/1965 | Weimer | H02G 5/06 174/88 B |
| 3,213,183 | A * | 10/1965 | Weimer | H02G 5/06 174/33 |
| 3,213,300 | A * | 10/1965 | Davis | H02G 5/06 174/68.2 |
| 3,450,826 | A * | 6/1969 | Hanes | H02G 5/06 174/34 |
| 3,531,653 | A | 9/1970 | Willyoung | |
| 3,780,355 | A | 12/1973 | Salvati | |
| 4,366,528 | A * | 12/1982 | Cole | H02G 5/025 174/133 B |
| 5,789,711 | A * | 8/1998 | Gaeris | H01B 11/02 174/113 C |
| 5,854,472 | A * | 12/1998 | Wildi | H05B 3/56 219/212 |
| 5,986,355 | A | 11/1999 | Rosen | |
| 6,365,836 | B1 * | 4/2002 | Blouin | H01B 11/06 174/113 C |
| 6,489,567 | B2 * | 12/2002 | Zachrai | H02G 5/025 174/149 B |
| 6,506,971 | B1 * | 1/2003 | Grach | H01B 7/30 174/32 |
| 6,934,147 | B2 * | 8/2005 | Miller | H02B 1/21 174/68.2 |
| 7,310,242 | B2 | 12/2007 | Ramos | |
| 7,786,382 | B2 * | 8/2010 | Burguera | H02G 5/06 174/68.2 |
| 7,952,025 | B2 * | 5/2011 | Diaz | H02B 1/21 174/68.2 |
| 8,619,411 | B2 * | 12/2013 | Rodrigues | H02B 1/21 174/68.2 |
| 9,123,458 | B2 * | 9/2015 | Griffin | H01B 11/12 |
| 2005/0162817 | A1 | 7/2005 | Miller | |
| 2009/0178824 | A1 | 7/2009 | Burguera | |
| 2010/0163268 | A1 | 7/2010 | Diaz et al. | |
| 2010/0307811 | A1 * | 12/2010 | Griffin | H01B 11/12 174/350 |
| 2013/0114185 | A1 | 5/2013 | Rodrigues | |
| 2014/0069718 | A1 | 3/2014 | Kroulik | |
| 2015/0107874 | A1 * | 4/2015 | Green | H01B 9/006 174/114 R |

FOREIGN PATENT DOCUMENTS

| | | | |
|---|---|---|---|
| DE | WO 2005031932 A1 * | 4/2005 | H02B 1/20 |
| EP | 1763118 A2 | 3/2007 | |
| EP | 2031604 A2 | 3/2009 | |
| FR | 2276715 A1 * | 1/1976 | H02G 5/06 |
| GB | 317099 A | 8/1929 | |
| JP | S52116848 | 9/1977 | |
| JP | S5413945 U | 2/1979 | |
| JP | 09180550 A | 7/1997 | |
| JP | H09182260 A | 7/1997 | |
| JP | 2002165314 A | 6/2002 | |
| JP | 2007135298 A | 5/2007 | |
| KR | 101148840 B1 | 5/2012 | |
| WO | 0000989 A1 | 1/2000 | |
| WO | 2005031932 A1 | 4/2005 | |
| WO | 2010144543 A2 | 12/2010 | |
| WO | 2014066223 A | 5/2014 | |

* cited by examiner

METHODS AND ARRANGEMENTS FOR ATTENUATING MAGNETIC FIELDS OF ELECTRICAL CABINETS

TECHNOLOGICAL FIELD

The disclosure herein relates to attenuation of low frequency magnetic fields appearing near and within electrical cabinets.

BACKGROUND

Scientific research and investigation of the influence of continuous exposure to existing environmental alternating electromagnetic fields has led to the adoption of the ALARA (as low as reasonably achievable) rule that calls for use of any protection from magnetic fields that is possible at reasonable costs. It was also recommended that the field level would be limited to 0.2 µT for frequencies in the range of 50 Hz÷300 Hz.

A primary source of magnetic fields in electrical cabinets (e.g., cable/power distribution cabinets) is the bus-bar system from which output branches are distributed from the cabinet through circuit breakers. Thus, people residing in the vicinity of these electrical cabinets are typically exposed to magnetic fields of magnitudes that may exceed minimum requirements set for occupational safety and health. Moreover, devices and communication cables residing in the vicinity of electrical cabinets may suffer from magnetic interferences originating from the magnetic fields emanating from the cabinets.

Heretofore, attempts to reduce the effect of magnetic fields emanating from electrical cabinets mainly suggested partly or fully enclosing the electrical cabinet, or portions thereof, inside magnetic shielding structures made of metallic materials. For example, in order to reach the 0.2 µT field level near electrical cabinets, typically thick metal sheets are used in order to shield the cabinet, or in another possible approach, the electrical cabinet is relocated a certain distance from public areas.

EP 1 763 118 suggests using a metallic protective element serving as a magnetic shield designed to at least partially enclose distribution fuses/connectors of electrical cabinets. This solution focuses on the distribution connectors of the cabinet without considering the magnetic fields emanating from the bar bus system of the cabinet, which is a main source of magnetic fields from cabinets. Furthermore, this solution provides only limited protection due to the need to leave the front part of the metallic protective element open so it may be easily accessed for regular operational purposes and routine maintenance.

GENERAL DESCRIPTION

There is a need in the art for electrical cabinet designs capable of substantially reducing the strength of magnetic field emanating from the cabinets. The relatively high magnetic field magnitudes in the vicinity of electrical cabinets require partial or full enclosure of the cabinets within metallic shields and/or to locate the electrical cabinets at distant locations remote from populated areas, in order to reduce/prevent exposure to their magnetic fields. Such solutions typically lead to increased costs and complexity of the cabinets and of the electrical infrastructures associated with them.

The present application provides techniques for designing and arranging the internal wiring, bus-bars, and connection terminals, of electrical cabinets to guarantee substantial reduction of magnetic fields emanating from such cabinets. The inventors of the present application found out that magnetic fields emanating from electrical cabinets may be substantially reduced by arranging the elements of the cabinet that carry electricity inside the cabinet to form self-protective structures that provide that the magnetic fields emanating from the different electricity carrying elements of the cabinet destructively interfere with each other, and thereby substantially reduce the magnitude of the total magnetic field emanated from the electrical cabinets.

For example, and without being limiting, in some embodiments each bus-bar element of the bus-bar system of the electrical cabinet is formed by a group of at least two sub-bus-bar elements electrically connectable to each other in parallel, each group of the sub-bus-bar elements being electrically connectable to at least one electric phase supplied to the cabinet, and the sub-bus-bar elements are arranged such that each sub-bus-bar element is located adjacent at least one other sub-bus-bar element associated with either different electrical phase or different electrical current direction, to thereby cause magnetic fields emanating from the sub-bus-bar elements to destructively interfere with each other.

In some embodiments the sum of cross-sectional areas of the sub-bus-bar elements associated with a specific electric phase or current direction are adjusted to be substantially equal to a cross-sectional area of an original bus-bar element associated with the same specific electric phase or current direction which was replaced by the sub-bus-bar elements, or to a design cross-sectional area thereof per electric law/regulation and standards. Optionally, the sum of electric currents that pass through the sub-bus-bar elements equals to a given nominal electric current of the original bus-bar element which the sub-bus-bar elements replaced.

For example, and without being limiting, the modified electrical cabinet may be designed to guarantee maximal attenuation of magnetic fields emanating from its various elements by ensuring that the following condition is met for all magnetic moments $M_i$ and dipoles $P_i$:

$$\sum_{i=1}^{N} \overline{M_i} = 0, \qquad (1)$$

$$\sum_{i=0}^{N} \overline{P_i} = 0,$$

where N is the total number of magnetic field emanating elements in the cabinet, and i is an integer index designating a particular dipole/moment. Accordingly, the location, geometrical arrangement and/or connectivity of each electricity carrying element (e.g., bus-bars, sub-bus-bars, wires, cables, and/or circuit breakers) of the cabinet may be modified in order to substantially meet the conditions set in equation (1).

In some possible embodiments cables used in the electrical cabinet to supply and deliver electricity are self-protected cables that produce very low magnetic fields (e.g., at very low frequencies of about 50 Hz to 400 Hz), as described in International Patent Publication No. WO 2014/006622, of the same applicant hereof, the disclosure of which is incorporated herein by reference.

The techniques disclosed herein may allow using regular electrical cabinets (e.g., made of wood or plastic) instead of metallic cabinets without any risk of high level magnitudes of magnetic fields. Thus the electrical cabinet designs disclosed herein may be fabricated for placement wherever convenient as required by the electric design, without requiring placing them at distant locations, away from populated zones, in order to reduce the magnetic field levels, and reduce exposure to such magnetic fields, as is common practice with regular electrical cabinets.

The techniques disclosed herein may be used to modify conventionally designed electrical cabinets by arranging the internal wiring and bus-bar system of the cabinet to form self-protective structures in which the magnetic fields emanating from each of the electricity carrying elements of the cabinets destructively interfere with each other. For example, and without being limiting, a single or multi-phase conventional electrical cabinet may be modified to attenuate the magnetic fields emanating from the cabinet by modifying the standard bus-bar system of the cabinet by replacing each one of the original bus-bar elements of the cabinet with two or more sub-bus-bar elements connected to each other in split connection (e.g., wherein at least two elements are connected in parallel), and arranging the sub-bus-bar elements such that each one of the sub-bus-bar elements is situated adjacent at least one other sub-bus-bar element associated with a different electrical phase or carrying electrical current in a different direction.

According to one aspect there is provided a bus-bar system for distributing electrical power supplied by an electrical supply cable comprising two or more electrically conducting wires, the bus-bar system comprising a predetermined number of bus-bar elements each electrically connectable to at least one of the wires of the electrical supply cable, and at least one of the bus-bar elements being formed by a group of at least two sub-bus-bar elements electrically connectable to each other in parallel, each group of the sub-bus-bar elements being electrically connectable to at least one of the wires of said electrical supply cable, each of said bus-bar and sub-bus-bar elements being located adjacent at least one other bus-bar or sub-bus-bar element associated with either different electrical phase or different electrical current direction to thereby cause magnetic fields emanating from said bus-bar and sub-bus-bar elements to destructively interfere with each other.

In possible embodiments the bus-bar system distributes electrical power supplied by an electrical supply cable supplying two or more electrical phases, the bus-bar system comprising two or more bus-bar elements, each associated with a specific phase of the electrical supply cable, at least one of the bus-bar elements being formed by a group of at least two sub-bus-bar elements electrically connectable to each other in parallel, where each group of the sub-bus-bar elements being associated with a specific phase of the electrical supply cable, each of the bus-bar and sub-bus-bar elements being located adjacent at least one other bus-bar or sub-bus-bar element associated with a different electrical phase to thereby cause magnetic fields emanating from said bus-bar and/or sub-bus-bar elements to destructively interfere with each other.

In some embodiments the bus-bar and sub-bus-bar elements are made from elongated electrically conducting pieces geometrically arranged in parallel. Optionally, a summation of the cross sectional areas of the sub-bus-bar elements in each one of the groups of sub-bus-bar elements substantially equals to a cross sectional dimension (e.g., area) of at least one of the bus-bar elements, or to a cross sectional dimension (e.g., area) of such bus-bar elements in an original bus-bar system design, divided by the number of sub-bus-bar elements in the group.

According to some embodiments the bus-bar and sub-bus-bar elements are arranged in parallel columns such that the bus-bar and sub-bus-bar elements are arranged in the columns in a spaced apart substantially parallel relationship along axes of the columns Optionally, the sub-bus-bar elements are arranged such that each one of the columns comprises a single sub-bus-bar element from a specific group of the sub-bus-bar elements. The distance between two adjacently located columns of sub-bus-bar elements, or bus-bar and sub-bus-bar elements, may optionally be equal to, or smaller than, the phase to phase distance (i.e., the distance between the bus-bars, and/or sub-bus-bars, adjacently located in the same column).

In some possible embodiments bus-bar and sub-bus-bar elements in any one of the columns are aligned with a gap between two neighboring sub-bus-bar elements, or bus-bar and sub-bus-bar elements, in an adjacently located column. Optionally, the arrangement of the bus-bar and sub-bus-bar elements in each column is shifted along the axis of the column relative to the arrangement of bus-bar and sub-bus-bar elements in at least one adjacently located column. In some applications the electrical parallel connectivity between the sub-bus-bar elements is achieved via the electrical supply cable.

In some embodiments the electrical supply cable is configured to supply at least two different electrical phases, and the bus-bar system comprises a corresponding number of groups of sub-bus-bar elements, each group being associated with a specific electrical phase of the electrical supply cable and comprising at least two sub-bus-bar elements electrically connectable to each other in parallel, wherein the sub-bus-bar elements are arranged in parallel columns such that they are substantially parallel to each other, and such that each sub-bus-bar element electrically associated with a specific electrical phase of the supply cable is situated in the bus-bar system adjacent at least one other sub-bus-bar element associated with a different electrical phase to thereby cause magnetic fields emanating from said sub-bus-bar elements to destructively interfere with each other.

In some embodiments an order of electrical phases in each column of sub-bus-bar elements is cyclically shifted relative to an order of the electrical phases in at least one adjacently located column of sub-bus-bar elements.

Optionally, the electrical supply cable is a self-protected cable designed to substantially attenuate magnetic fields emanating from its conductors, and the electrical parallel connectivity between the sub-bus-bar elements is achieved through the cable.

According to another aspect of the present application there is provided an electrical cabinet comprising a bus-bar system for distributing electrical power supplied by a three-phase electrical supply cable, the bus-bar system comprising three bus-bar elements each associated with a respective phase of the electrical supply cable, each one of the bus-bar elements being in the form of a group of at least two sub-bus-bar elements electrically connectable to each other in parallel, each group of the sub-bus-bar elements being associated with a specific phase of the electrical supply cable, and each one of the sub-bus-bar elements being situated adjacent at least one other sub-bus-bar element associated with a different electrical phase. The cabinet may further comprise one or more circuit breakers, each electrically connectable to at least one sub-bus-bar element carrying a specific phase. Preferably, each circuit breaker is electrically connected to the sub-bus-bar elements of a specific group of elements associated with a specific electric phase.

The electrical cabinet may further comprise one or more neutral bus-bars, or a group of neutral sub-bus-bar elements, associated with an electric neutral of the power supply, and electrically connectable to at least one neutral wire of a power supply line branching out from the electrical cabinet via one of the circuit breakers. Optionally, the at least one neutral wire passes adjacent and substantially parallel to the circuit breaker.

The electrical connectivity in the cabinet may be carried out utilizing single-phase self-protected cables, each one of the single-phase cables comprising a plurality of conductors, a predetermined number of the conductors are used for carrying an electric phase and another predetermined number of the conductors are used for carrying an electric neutral, the conductors being arranged in each cable such that magnetic fields emanating from them destructively interfere with each other.

The destructive inference of the magnetic fields may be achieved by electrically connecting the phase carrying conductors of each such single-phase cable to each other in parallel, electrically connecting the neutral carrying conductors to each other in parallel, and arranging the conductors inside the cable such that each phase carrying conductor (i.e., that is connected to the electric phase) is located inside the cable near at least one neutral carrying conductor (i.e., that is connected to the electric neutral). Attenuation of the magnetic fields is maximized by placing the conductors inside each single-phase cable at fixed distances from each other and preventing movement of the conductors one relative to the other thereinside.

For example, and without being limiting, in some embodiments some of the single-phase cables comprise a central supporting element and the conductors of the cables are arranged in a circular form around the supporting element such that each phase carrying conductor is located inside the cable near at least one neutral carrying conductor. Preferably, each phase carrying conductor is located inside the cable between two neutral carrying conductors. The supporting element is configured to maintain the conductors in fixed locations inside the cable and prevent displacement of the conductors thereinside. The central supporting element may be an elongated element having a multipoint cross-sectional star or asterix shape configured to define a predetermined number of elongated indentations, each configured to receive and hold one of the conductors of the cable.

According to yet another aspect of the present application, there is provided a method of reducing magnetic field emanated from a single or multi-phase electrical cabinet utilizing a bus-bar system, comprising providing each bus-bar element of the bus-bar system in the form of two or more sub-bus-bar elements, arranging the sub-bus-bar elements such that each one of the sub-bus-bar elements is situated adjacent at least one other sub-bus-bar element associated with a different electrical phase or carrying electrical current in a different direction, and establishing parallel electrical connection between the two or more sub-bus-bar elements associated with same electrical phase or electrical current direction.

In some embodiments, the sub-bus-bar elements are arranged in parallel columns, and the bus-bar and sub-bus-bar elements are arranged in said columns in a spaced apart substantially parallel relationship along axes of the columns.

Optionally, the arranging may comprise cyclically shifting an order of electrical phases or current directions in each column of bus-bar elements relative to an order of the electrical phases or current directions in at least one adjacently located column of bus-bar elements.

BRIEF DESCRIPTION OF THE DRAWINGS

In order to understand the invention and to see how it may be carried out in practice, embodiments will now be described, by way of non-limiting example only, with reference to the accompanying drawings, in which like reference numerals are used to indicate corresponding parts, and in which:

FIG. 5A shows a cross-sectional view of a cable having four conductors and a circular supporting element, FIG. 5B shows a cross-sectional view of a cable having a cross-shaped supporting element, and FIG. 5C shows a perspective view of a cable having a star shaped supporting element;

FIG. 6A shows a cross-sectional view of a cable having six conductors, FIG. 6B shows a cross-sectional view of a cable having a star-shaped supporting element, and FIG. 6C shows a cross-sectional view of a cable having an asterix-shaped supporting element.

It is noted that the embodiments exemplified in the figures are not intended to be in scale and are in diagram form to facilitate ease of understanding and description.

DETAILED DESCRIPTION OF EMBODIMENTS

The present disclosure provides techniques for effectively reducing magnetic fields (e.g., low frequency of about 50 to 60 Hz) emanating from electrical cabinets. Particularly, the present invention provides electrical cabinet arrangements and methods of designing the internal wiring, connectivity and structure of electrical switchgear cabinets, that substantially attenuates external and internal magnetic fields.

Figure 1:
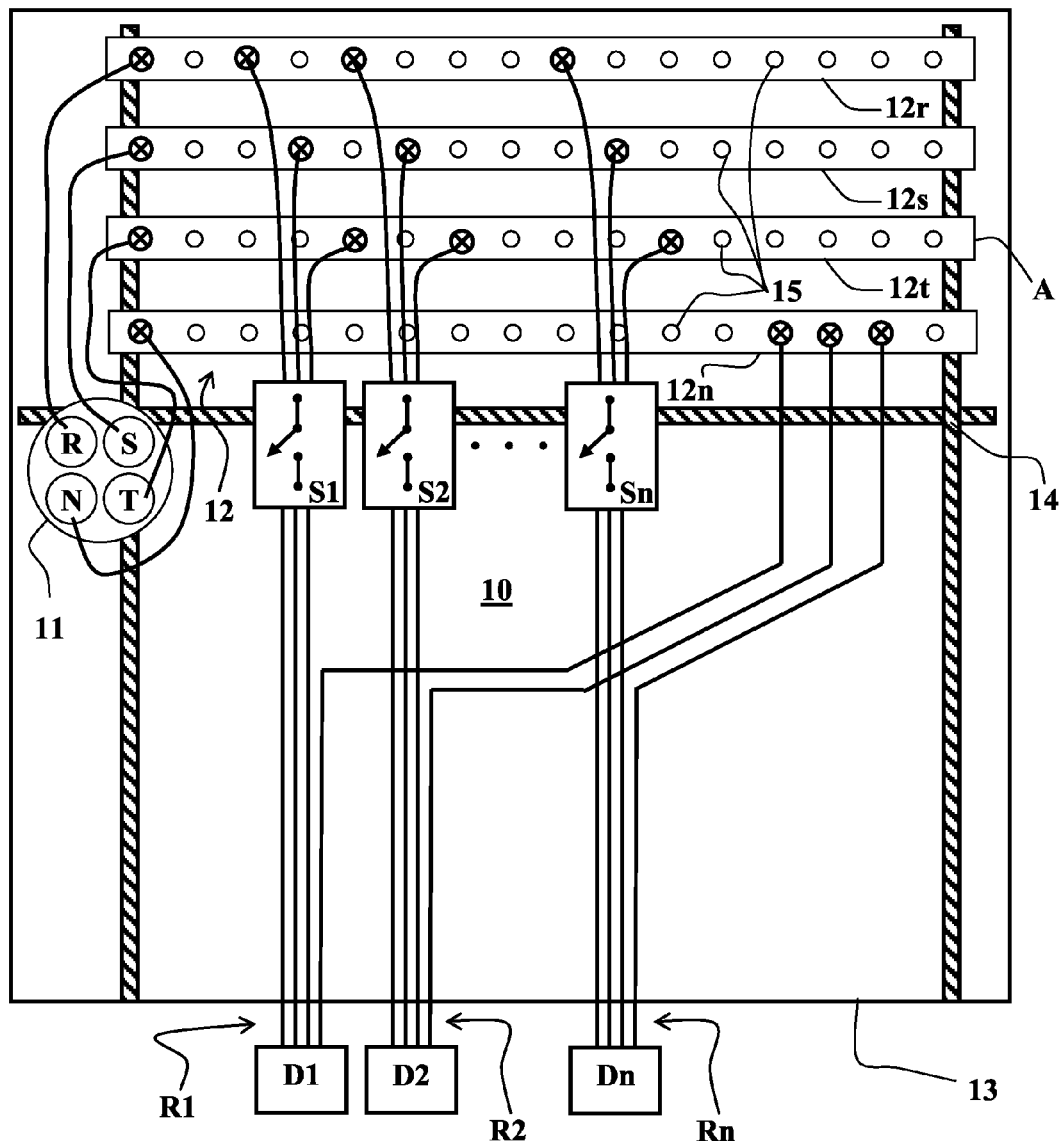
FIG. 1 schematically illustrates a conventional electrical cabinet arrangement.

FIG. 1 schematically illustrates a conventional arrangement of an electrical cabinet 10 exemplifying the main difficulties in the design and shielding of such cabinets against magnetic fields. The electrical cabinet 10 includes a housing 13 enclosing the internal parts of the cabinet which generally includes a supporting frame 14 mounted inside the cabinet and to which a bar bus system 12 and a set of circuit breakers S1, S2, . . . , Sn, are mechanically attached. The bar bus system 12 in this example is electrically connected to a three-phase power supply cable 11, and used to distribute the electrical power to output electrical supply branches R1, R2, . . . , Rn, that supply electric power to electrical devices and/or downstream electrical cabinets D1, D2, . . . , Dn.

The electrical supply cable 11 includes three wires for the 'R', 'S' and 'T' phases, and additional wire serving as the neutral wire 'N' (electrical '0'). Each of the wires of the electrical supply cable 11 is electrically connected inside cabinet 10 to a respective bus bar 12r, 12s, 12t and 12n, by means of connecting holes 15 provided in the bus-bars of the bar bus system 12. In this example, the output electrical supply branches R1, R2, . . . , Rn, are three phase branches receiving their electrical phases through the respective circuit breakers S1, S2, . . . , Sn, and their neutral wires are connected directly to the neutral bar bus 12n i.e., without a circuit breaker and particular arrangement.

As demonstrated in FIG. 1, the three phase carrying elements (i.e., bar, bus and wires) are typically grouped to form more or less flat bus structures and due to the relatively high electrical currents supplied through them they typically emanate constructively interfering magnetic fields which may add up to magnitudes that exceed the minimum safety/health requirements.

It is a basic idea of the present application to arrange the electrically conducting elements of an electrical cabinet in a way that promotes destructive interference of magnetic fields emanating therefrom and thereby effectively attenuate their magnitudes. For example, and without being limiting, in some possible embodiments an original electrical cabinet design is modified by constructing at least some of the electrically conducting elements of the cabinet from a number of sub-elements electrically connected in parallel to each other and arranging the sub-elements such that each sub-element is placed in a vicinity of one or more other sub elements (or original/non-split elements) associated with either a different phase or a different current direction. Accordingly, in some embodiments, each modified element (e.g., bus-bar element) from the original cabinet design is constructed from two or more electrically conducting sub-elements electrically connected in parallel to each other. The sum of cross-sectional areas of the sub-elements may equal to a cross-sectional area of the element in the original design (i.e., before being modified) of the cabinet e.g., as required according to electric laws/regulations and standards. The electrical currents that pass through the sub-elements are substantially equal, and their sum equals to the electrical current that would have been obtained in the element of the original cabinet design. Effective attenuation of the magnetic fields is typically obtained by geometrically arranging the sub-elements of each element from the original cabinet design in parallel to each other.

According to some embodiments an original electrical cabinet design is modified to reduce the magnetic field emanating therefrom, as follows:
i) modifying internal layout and electrical connections of the cabinet by passing each electrical phase inside the cabinet over at least two elements (e.g., bus-bars or wires) electrically connected to each other in parallel, placing each element near at least one other element associated with another electrical phase, and/or passing the electrical neutral wires along and substantially parallel to the wires carrying the electrical phases (e.g., of respective output branches); and/or
ii) by using for the internal wiring of the cabinet specially designed self-protective electrical cables designed to substantially attenuate magnetic fields e.g., as described and claimed in International Patent Publication No. WO 2014/006622, of the same applicant hereof, the disclosure of which is incorporated herein by reference.

These techniques allow designing single-phase, as well as multi-phase, electrical cabinets having very low magnetic fields magnitudes (e.g., in the range of 0.1 to 1.0 µT) and thereby provide self-protected electrical cabinet designs and arrangements.

For example, and without being limiting, according to some embodiments an electrical power supply feeding the electrical cabinet may be a self-protected electrical supply cable in which at least one electrical conductor (also referred to herein as wire) is split into two or more sub-conductors having same cross-sectional areas and electrically connected to each other in a parallel connection, wherein each sub-conductor is arranged in the self-protective cable to reside adjacent at least one other conductor or sub-conductor associated with either a different phase or a different current direction. The self-protective supply cable, in some embodiments, is electrically connected to a modified bus-bar system in which at least one of the original bus-bar elements of the original cabinet design is split into a number of sub-bus-bar elements, for example, and without being limiting, corresponding to the number of sub-conductors in the respective phase in the self-protective power supply cable, where the sub-bus-bar elements of each split original bus-bar element are electrically connected to each other in at least one end (e.g., any set of elements connected in parallel may be connected in one end or in the two ends of the elements).

The modified bus-bar system may be arranged such that its bus-bar and sub-bus-bar elements are geometrically arranged inside the cabinet in parallel to each other, and such that each of the bus-bar and the sub-bus-bar elements is placed in the vicinity of at least one other bus-bar and/or sub-bus-bar element associated with either a different phase or a different current direction, to thereby assure that the magnetic fields emanating from the bus-bar and the sub-bus-bar elements destructively interfere with each other.

In some embodiments, the modified bus-bar is arranged such that each one of the bus-bar and the sub-bus-bar elements is placed in the vicinity of at least one other bus-bar and/or sub-bus-bar element associated with either a different phase or a different current direction, and relatively distant from other bus-bar and/or sub-bus-bar elements associated with either the same phase or the same current direction, to thereby ensure that the magnetic fields emanating from the bus-bar and the sub-bus-bar elements destructively interfere with each other.

In some embodiments one or more circuit breakers may be electrically connected to the modified bus-bar system such that each circuit breaker is electrically connected by wires to at least some of the bus-bar and/or sub-bus-bar elements associated with either a specific phase or a specific current direction.

In some possible embodiments, the electrical parallel connection between sub-conductors associated with same specific electrical phase or current direction of the self-protected electrical supply cable, that supplies electrical power to the electrical cabinet, is obtained by electrically connecting the sub-conductors to each other at a distal end (relative to the electrical cabinet) of the self-protected cable, connecting each sub-conductor (at the other end of the cable) to a respective sub-bus-bar element of the modified bus-bar system of the cabinet, and electrically connecting the sub-bus-bar elements associated with the same specific electrical phase or current direction to at least one circuit breaker. In other words, the electrical parallel connection between the sub-bus-bar elements associated with a specific electric phase or current direction may be obtained by electrically connecting the sub-conductors at one end of the self-protected electrical power supply cable to each other, and electrically connecting the other end of the sub-conductors to respective sub-bus-bar elements, and establishing electrical connection between the sub-bus-bar elements by wires electrically connecting the bus-bus-bar elements to the circuit breakers.

In three-phase electrical cabinets the modified bus-bar system may further comprise one or more neutral bus-bar and/or sub-bus-bar elements. In possible embodiments the electrical cabinet is configured to distribute electrical current from the modified bus-bar system over one or more electric supply output branches each carrying a specific phase. For example, and without being limiting, each electric supply output branch may comprise one or more wires electrically connected to an output terminal of a respective circuit breaker mounted inside the cabinet, and one or more neutral wires electrically connected to at least one of the neutral bus-bar and/or sub-bus-bar elements.

In some embodiments electrical connectivity of the electrical phases is carried out using self-protected single-phase cables. The self-protected single-phase cables comprise at least two phase carrying wires (i.e., conductors) electrically connected to each other in parallel and at least two neutral carrying wires electrically connected to each other in parallel, where the wires are arranged such that each phase carrying wire is located adjacent at least one neutral carrying wire. In some possible embodiments the one or more neutral wires pass adjacent and substantially parallel to the respective circuit breaker through which the electric supply output branch associated with the neutral wires is being fed.

In the following description curly brackets '{ }' are used to designate an arbitrarily ordered set of elements (i.e., no specific order of the elements indicated between the brackets), and square brackets '[ ]' to designate a specific order of the elements as indicated between the brackets.

Figure 2A:
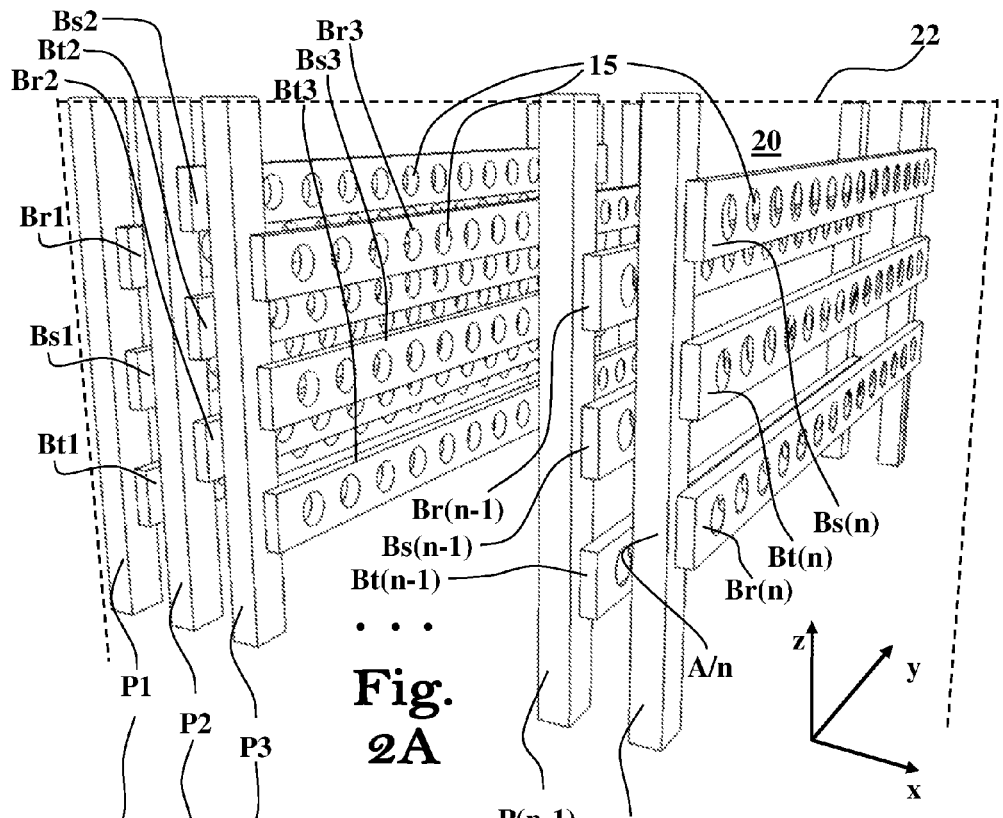
FIGS. 2A to 2C show bar bus systems according to some possible embodiments.

FIG. 2A shows a modified three-phase bus-bar system 20 according to some embodiments. In this example each bus-bar element of the original design of the bus-bar system (e.g., 12) is split into n sub-bus-bar elements (where n is a positive integer n≥2), where each sub-bus-bar element may have a cross-sectional area of about A/n, where A is the cross sectional area of the corresponding bus-bar element in the original bus-bar system design (12). For example, and without being limiting, the bus-bar element carrying the "R" phase in the original design (12r) is split in the modified bus-bar system 20 into n sub-bus-bar elements designated by reference numerals Br1, Br2, Br3, . . . , Br(n−1) and Br(n), the bus-bar element carrying the "S" phase in the original design (12s) is split into n sub-bus-bar elements designated by reference numerals Bs1, Bs2, Bs3, . . . , Bs(n−1) and Bs(n), and the bus-bar element carrying the "T" phase in the original design (12t) is split into n sub-bus-bar elements designated by reference numerals Bt1, Bt2, Bt3, . . . , Bt(n−1) and Bt(n).

Each triplicate of sub-bus-bar elements (also referred to herein as a column of sub-bus-bar elements) {Bri, Bsi, Bti} (where i is a positive integer 1≥i≥n) may be mounted inside the cabinet 22 on one or more respective frame supports Pi. For example, and without being limiting, the first triplicate (i=1) of sub-bus-bar elements {Br1, Bs1, Bt1} is mounted on support frame P1, second triplicate (i=2) of sub-bus-bar elements {Br2, Bs2, Bt2} is mounted on support frame P2, and so forth. The support frames are arranged in parallel to each other inside the electrical cabinet 22 such that the sub-bus-bar elements mounted on them are also substantially parallel to each other. For example, and without being limiting, the supporting frames may be arranged in parallel by mounting them inside the electrical cabinet substantially perpendicular to a first geometrical plane such that the sub-bus-bar elements mounted on the supporting frames are arranged parallel to each other by arranging them in parallel to another geometrical plane being substantially perpendicular to the first geometrical plane. For example, and without being limiting, in FIG. 2A the supporting elements P1, P2, P3 . . . are mounted substantially perpendicular to the 'x'-'y' plane and the respective triplicates of sub-bus-bar elements {Bri, Bsi, Bti} i=1, 2, 3, . . . , n are mounted on the supporting elements substantially parallel to the 'y'-'z' plane.

Supporting elements Pi may be prepared from elongated rectangular/circular posts/rods made from any suitable material, such as plastic or ceramic, and the sub-bus-bar elements may be elongated rectangular elements made from any suitable electrically conducting material, such as copper, and/or aluminum.

Figure 2B:
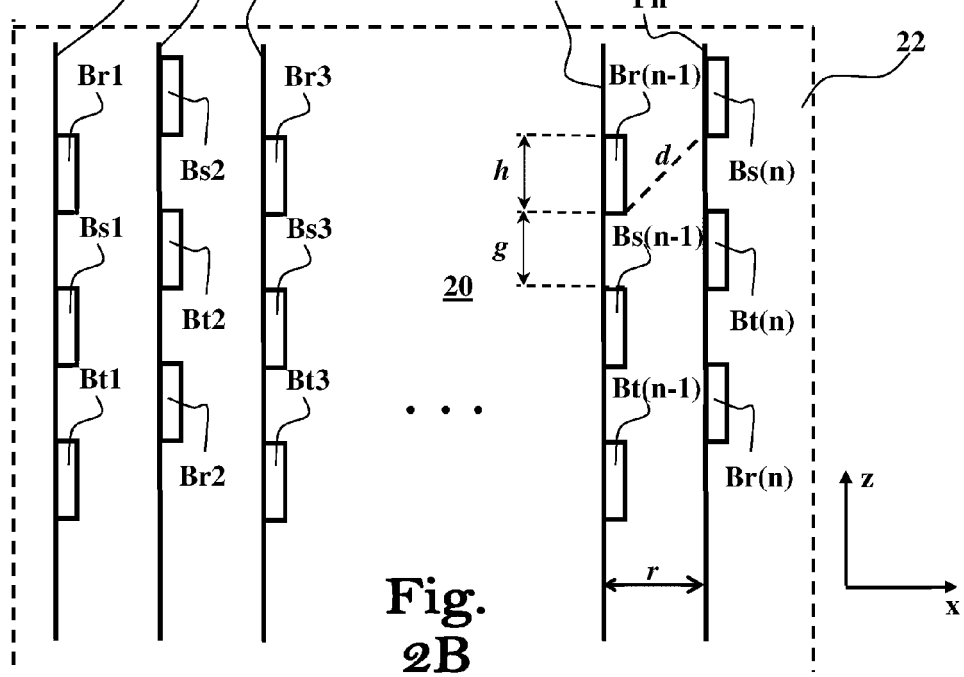

With reference to FIG. 2B, schematically illustrating the modified bus-bar system 20 in a side view, the sub-bus-bar elements of each triplicate of sub-bus-bar elements {Bri, Bsi, Bti} i=1, 2, 3, . . . , n may be arranged on the respective supporting frames in a different order of the phases in order to position each sub-bus-bar element adjacent at least one other sub-bus-bar element associated with another phase. In the side view shown in FIG. 2B each triplicate of sub-bus-bar elements {Bri, Bsi, Bti} is shown in the form of a column mounted on a respective supporting post Pi (i=1, 2, 3, . . . , n). For example, and without being limiting, the sub-bar elements of the first triplicate {Br1, Bs1, Bt1} may be arranged on the supporting post P1 such that the "R" phase carried by Br1 is topmost, the "T" phase carried by Bt1 is lower-most, and the "S" phase carried by Bs1 is in between the "R" and "T" phases i.e., in the order of [Br1, Bs1, Bt1] from top to bottom, and the sub-bar elements of the second triplicate {Br2, Bs2, Bt2} may be arranged on the supporting element P2 such that the "S" phase carried by Bs2 is topmost and located in the 'y'-'z' plane above the "R" phase of the first triplicate (carried by the Br1 sub-bus-bar element), the "R" phase carried by Br2 is lower-most and located in the 'y'-'z' plane between the "S" and "T" phases of the first triplicate (carried by the respective Bs1 and Bt1 sub-bus-bar elements), and the "T" phase carried by Bt2 is in between the "S" and "R" phases of the second triplicate and located in the 'y'-'z' plane between the "R" and "S" phases of the first triplicate (carried by the respective Br1 and Bs1 sub-bus-bar elements) i.e., in the order of [Bs2, Bt2, Br2] from top to bottom. The following triplicates of sub-bus-bar elements (i.e., for i>2) are arranged similarly such that the phase order in sub-bus-bars triplicates mounted on supporting elements Pi indexed by odd numbers (i.e., for i=1, 3, 5, . . . ) are arranged from top to bottom as follows [Bri, Bsi, Bti], and the phase order in sub-bus-bars triplicates mounted on supporting elements Pi indexed by even numbers (i.e., for i=2, 4, 6, . . . ) are arranged from top to bottom as follows [Bsi, Bti, Bri].

As demonstrated in FIGS. 2A and 2B, this arrangement of the sub-bus-bar elements provides that each sub-bus-bar element carrying a specific phase is placed adjacent at least one other sub-bus-bar element carrying a different phase. Further, with this arrangement each sub-bus-bar element carrying a specific phase may be placed relatively remote from other sub-bus-bar elements carrying the same specific phase.

Figure 2C:
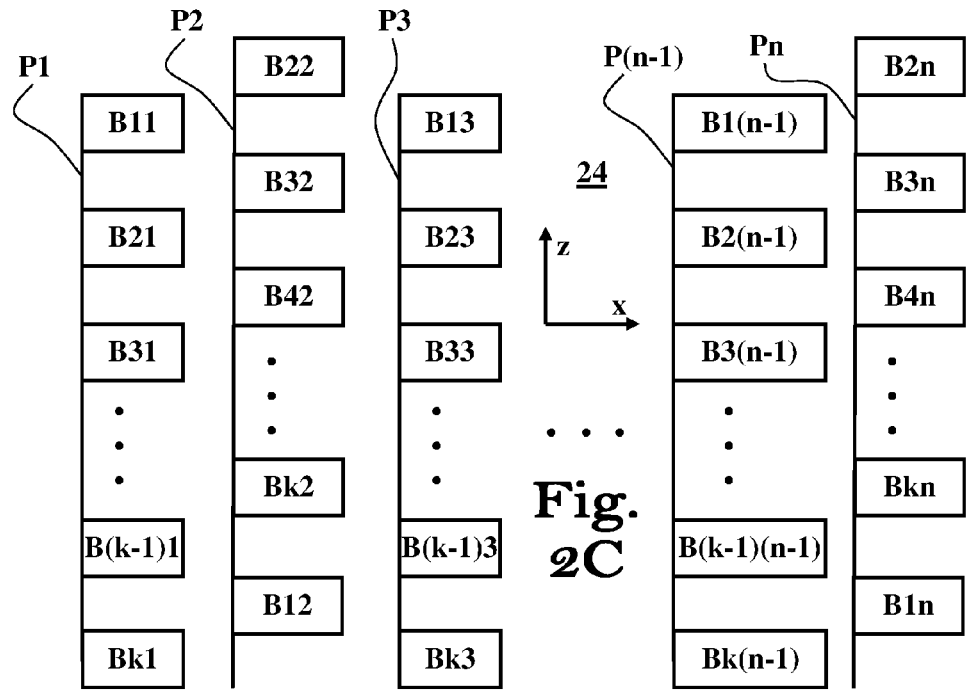

It is noted that the modified bus-bar system of the present application is not limited to the sub-bus-bar phase arrangement exemplified in FIGS. 2A and 2B, and that other arrangements that provide that each sub-bus-bar carrying a specific phase is placed adjacent at least one other sub-bus-bar element carrying a different phase, and/or relatively remote from other sub-bus-bar elements carrying the same specific phase, may be utilized in the electrical cabinet 22. For example, and without being limiting, FIG. 2C exemplifies a more general situation in which the modified bus-bar system 24 is configured to distribute k (k a positive integer greater than zero) different phases. In this example a column of k sub-bus-bar elements {B1i, B2i, B3i, . . . , Bki}, is mounted on respective supporting post Pi (i=1, 2, 3, . . . , n), and in order to position each sub-bus-bar element carrying a specific phase adjacent at least one other sub-bus-bar element carrying a different phase, the phases carried by the column of sub-bus-bar elements indexed by odd numbers (i.e., for i=1, 3, 5, . . . ) are arranged in the following order [B1i, B2i, B3i, . . . , B(k−1)i, Bki], and the phases carried by the columns of sub-bus-bar elements indexed by even numbers (i.e., for i=2, 4, 6, . . . ) are arranged in the following order [B2i, B3i, B4i, . . . , B(k−1)i, Bki, B1i], from top to bottom.

To further guarantee that the magnetic field emanating from the sub-bus-bar elements destructively interfere with each other, in some embodiments, the sub-bus-bar elements in each column of sub-bus-bar elements {B1i, B2i, B3i, . . . , Bki} mounted on a specific supporting element are spaced apart along the supporting element. While the gap g between adjacent sub-bus-bar elements mounted on the same supporting post should be as small as possible to increase the magnetic field attenuation, in some embodiments for sake of safety the gap g may be more or less equal to the height h of the sub-bus-bar elements, or even greater than the height h. In some embodiments adjacent columns of sub-bus-bar elements are shifted one relative to the other along the axis of the supporting elements (i.e., the 'z' axis). For example, and without being limiting, in FIGS. 2A and 2B the columns of sub-bus-bar elements {Bri, Bsi, Bti} indexed by even numbers (i.e., for i=2, 4, 6, . . . ) are shifted upwardly relative to the columns of sub-bus-bar elements {Bri, Bsi, Bti} indexed by odd numbers (i.e., for i=1, 3, 5, . . . ). In some embodiments the odd and even indexed columns are shifted one relative to the other a distance of about the length of the gap g between adjacent sub-bus-bar elements mounted on the same supporting post.

In this example the location of bus-bar elements in columns {Bri, Bsi, Bti} indexed by even numbers (i.e., for i=2, 4, 6, . . . ) are cyclically shifted relative to the bus-bar elements in the columns of sub-bus-bar elements {Bri, Bsi, Bti} indexed by odd numbers (i.e., for i=1, 3, 5, . . . ). More particularly, the topmost bus-bar element in the columns of bus-bar elements {Bri, Bsi, Bti} indexed by odd numbers (i.e., for i=1, 3, 5, . . . ) was moved in the columns of bus-bar elements {Bri, Bsi, Bti} indexed by even numbers (i.e., for i=2, 4, 6, . . . ) to become the lower-most element while shifting all the other elements of the column one locations upwardly (similar to a bitwise shift of a shift register). Accordingly, in this arrangement the phase association of the bus-bar elements of each column of bus-bar elements {Bri, Bsi, Bti} is cyclically shifted relative to at least one adjacently located column of bus-bar elements {Brj, Bsj, Btj} (where i≠j).

In possible embodiments the adjacently located columns of sub-bus-bar elements {Bri, Bsi, Bti} are located as close as possible to each other to improve magnetic field attenuation of the bus-bar system. For example, and without being limiting, in some possible embodiments the distance (r in FIG. 2B) between two adjacently located columns of sub-bus-bar elements is adjusted such that a diagonal (d) between adjacent sub-bus-bar elements on the two adjacently located columns is more or less equal to the distance g between two sub-bus-bar elements adjacently located on the same column e.g., about $$r \cong g \frac{\sqrt{3}}{2}.$$

However, in possible embodiments the distance between adjacently located columns of sub-bus-bar elements may be greater than this range for sake of safety (e.g., the distance r may be equal, or greater or smaller than, g).

Figure 3A:
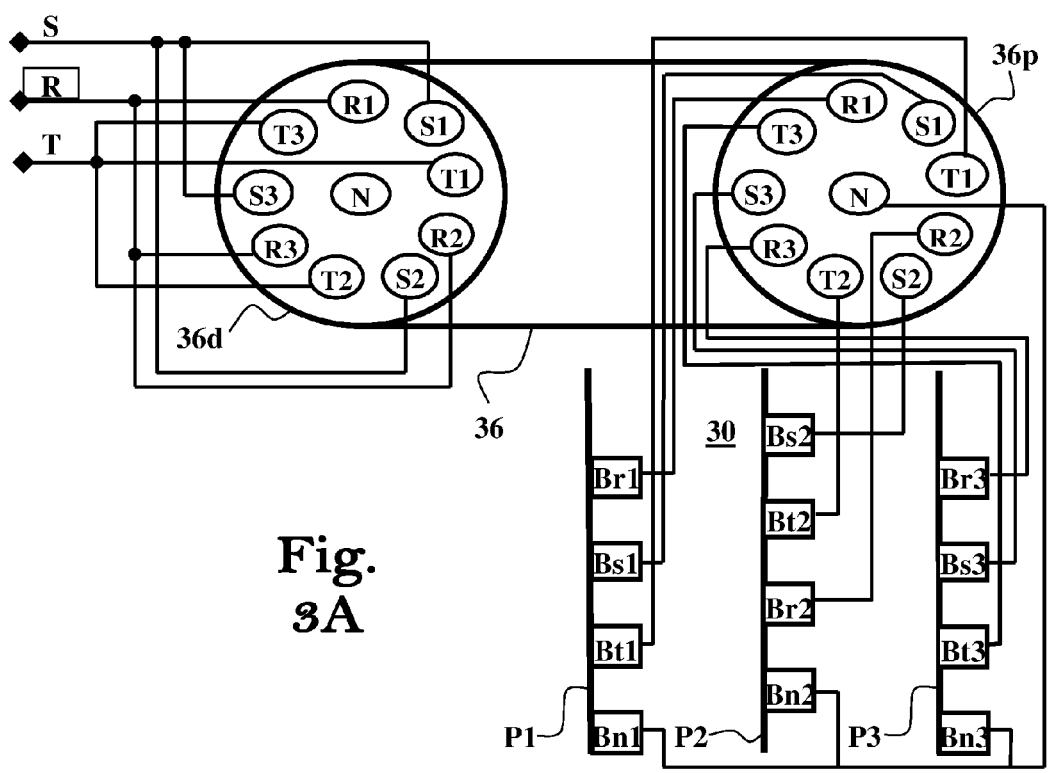
FIGS. 3A and 3B schematically illustrate wiring of a bar bus system according to some possible embodiments.
Figure 3B:
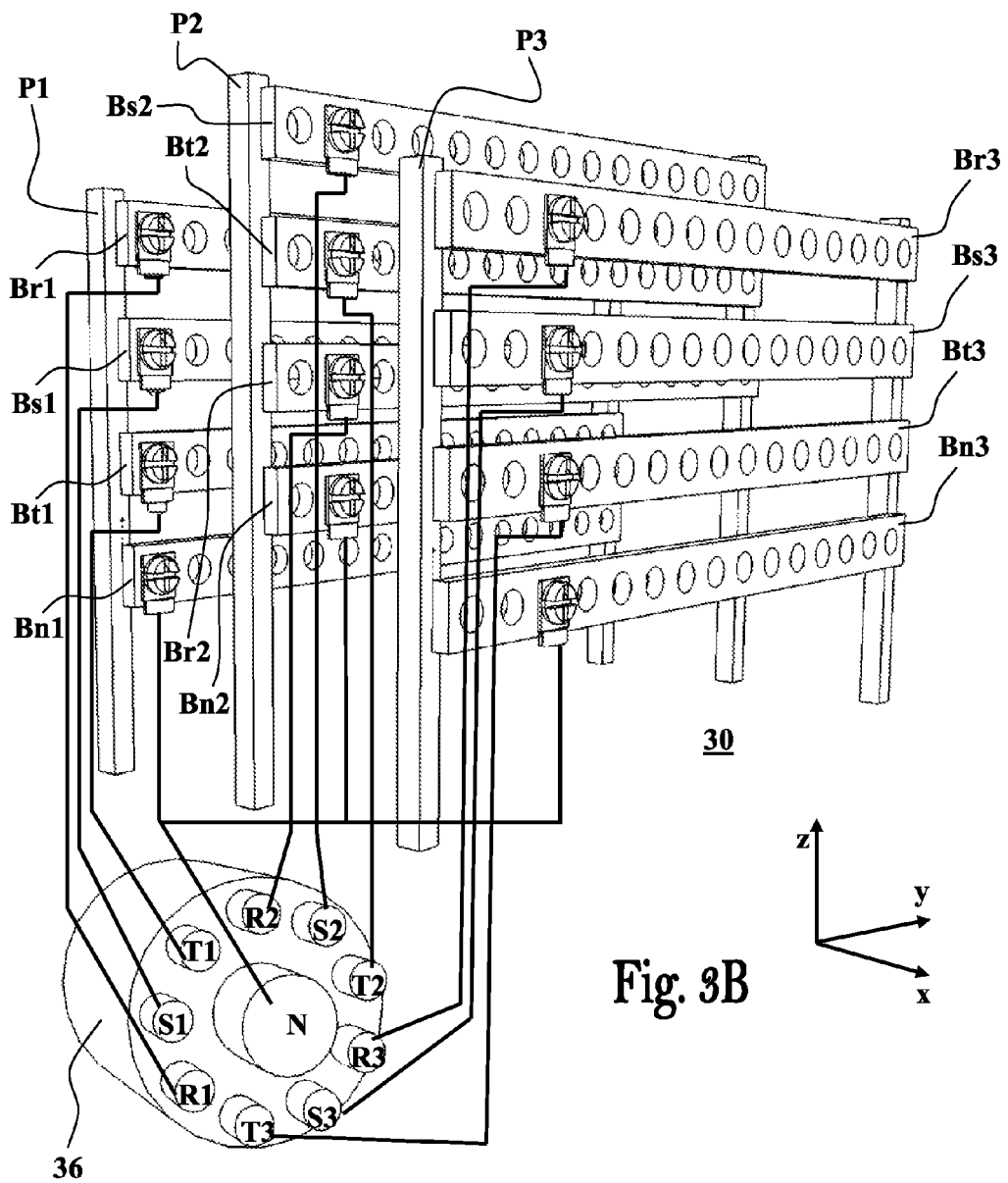

FIGS. 3A and 3B demonstrate electrical connectivity of a modified bus-bar system 30 to a self-protected three-phase cable 36 in which each phase ("R", "S" and "T") is carried by three separate sub-conductors (Ri, Si and Ti, i=1, 2, 3, respectively) electrically connected to each other in parallel (e.g., R1, R2 and R3 wires are connected to each other in parallel), and arranged such that each sub conductor carrying a specific phase is placed near at least one other sub-conductor carrying a different phase. For example, and without being limiting, the sub-conductors Ri, Si and Ti, of the self-protected cable 36 may be circularly arranged around a central wire N serving as the electrical neutral/zero.

In this example each bus-bar element of the original bus-bar design is split into three sub-bus-bar elements {Bri, Bsi, Bti} i=1, 2, 3, and each supporting element Pi carrying a triplicate of sub-bus-bar elements {Bri, Bsi, Bti} further includes an additional sub-bar element Bni that is electrically connected to the neutral wire N of the self-protected cable 36. As exemplified in FIG. 3A, the triplicates of sub-bus-bar elements are arranged such that the phases in columns of sub-bus-bar elements indexed by odd numbers (i.e., for i=1, 3, 5, . . . ) are arranged from top to bottom as follows [Bri, Bsi, Bti], and the phase order in columns of sub-bus-bar elements indexed by even numbers (i.e., for i=2, 4, 6, . . . ) are arranged from top to bottom as follows [Bsi, Bti, Bri]. Further, in the modified bus-bar system 30 the columns of sub-bus-bar elements indexed by even numbers (i.e., for i=2, 4, 6, . . . ) are shifted upwardly relative to the columns of sub-bus-bar elements indexed by odd numbers (i.e., for i=1, 3, 5, . . . ). It is noted that the modified bus-bar system 30 may comprise a single neutral bus-bar element (e.g., Bn1) while maintaining effective destructive interference of magnetic fields emanating from the phase carrying sub-bus-bar elements of the modified bus-bar system 30.

As demonstrated in FIGS. 3A-B, each group of sub-bus-bar elements associated with a specific electric phase is electrically connected to a respective group of sub-conductors of the self-protected cable 36 associated with the same specific electric phase. For example, and without being limiting, the sub-conductors of the "R" phase, R1, R2 and R3, of the self-protected cable 36 are electrically connected to respective sub-bus-bar elements Br1, Br2 and Br3, the sub-conductors of the "S" phase, S1, S2 and S3, are electrically connected to respective sub-bus-bar elements Bs1, Bs2 and Bs3, and the sub-conductors of the "T" phase, T1, T2 and T3, are electrically connected to respective sub-bus-bar elements Bt1, Bt2 and Bt3. In this way the sub-bus-bar elements actually provide electrical continuity to the sub-conductors of the self-protected electrical supply cable 36, such that the electrical parallel connection of sub-bus-bar elements associated with the same specific electrical phase may be achieved through the respective sub-conductors of the cable 36. For example, and without being limiting, the sub-conductors of the self-protected electrical supply cable 36 associated with a specific electrical phase may be electrically connected to each other at a distal end (36d)(relative to the cabinet) of the cable 36, and the electrical parallel connection may be completed by establishing electrical connection between the respective sub-bus-bar elements at one or more circuit breakers (as exemplified in FIG. 4).

As best seen in FIG. 3A, the sub-conductors Ri, Si and Ti, (i=1, 2, 3) associated with a specific phase are connected to each other at the distal end 36d of the cable 36 (i.e., the sub-conductors Ri associated with the "R" phase are connected to each other, and so the Si sub-conductors associated with the "S" phase and the Ti sub-conductors associated with the "T" phase). At the proximal end 36p of the cable 36 the sub-conductors Ri, Si and Ti, (i=1, 2, 3) are connected to their respective sub-bus-bar element Bri, Bsi and Bti, (i=1, 2, 3). In this configuration the sub-bus-bars elements of the modified bus-bar system 30 provide continuation to the sub-conductors of the cable 36, wherein the circular arrangement of the sub-conductors of the cable 36 is replaced by the shifted column arrangement of the sub-bus-bars elements. It is noted that in possible embodiments the sub-bus-bars elements may be arranged in a circular fashion similar to the arrangement of the sub-conductors in the cable 36.

Figure 4:
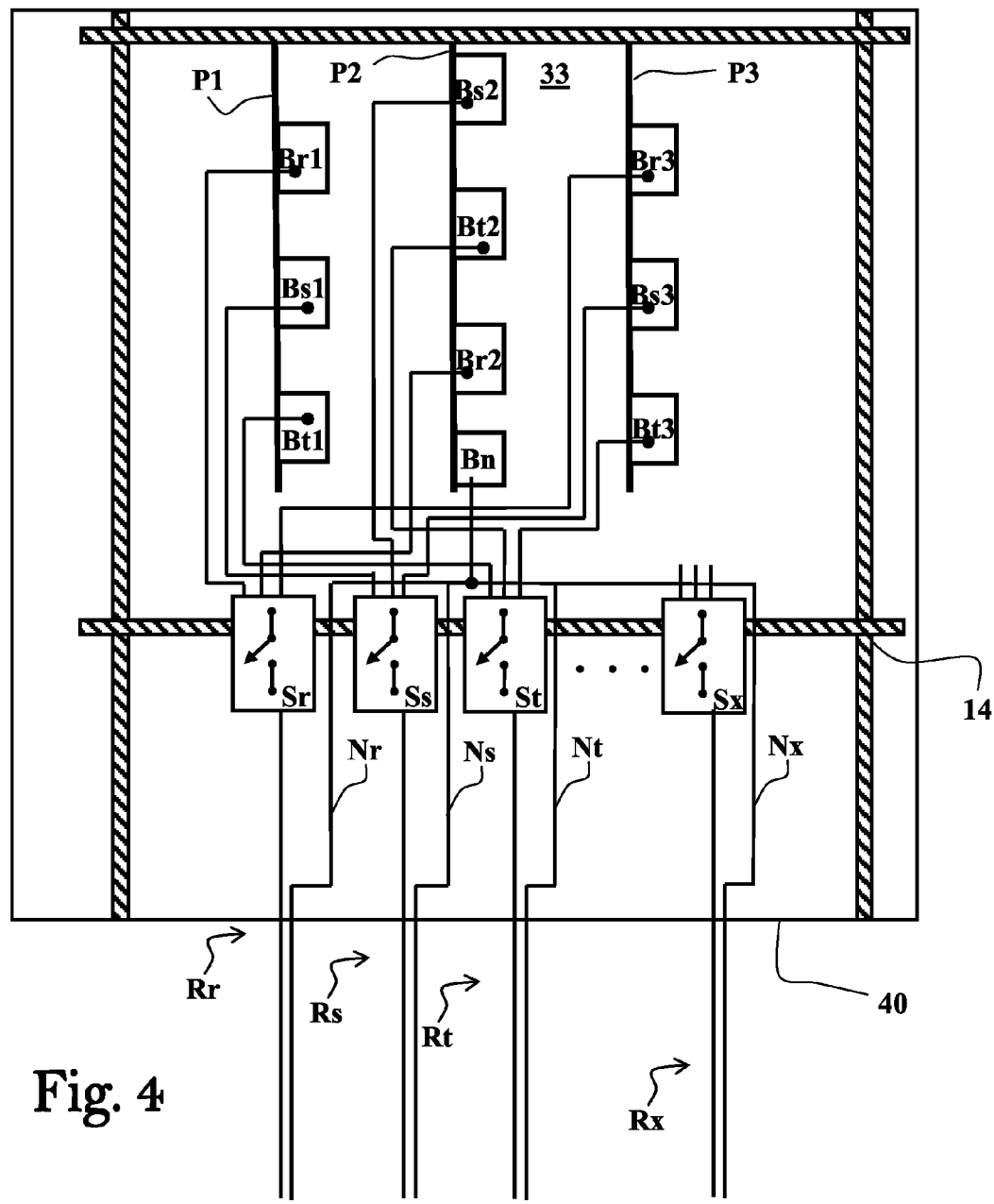
FIG. 4 schematically illustrates an electrical cabinet arrangement according to some possible embodiments.

FIG. 4 schematically illustrates a possible electrical cabinet 40 arrangement according to some possible embodiments. In this example, for sake of simplicity, the modified bus-bar system 33 of the electrical cabinet 40 is shown in side view, while the cabinet 40 and an all its other components are shown are shown in a front view. The modified bus-bar system 33 is substantially similar to the modified bus-bar system 30 shown in FIG. 3, and being different therefrom mainly in that the modified bus-bar system 33 includes a single neutral bus-bar element Bn mounted on the central supporting post P2.

The electrical cabinet 40 comprises a plurality of circuit breakers Sr, Ss, St, . . . , Sx, each of which may be configured to branch out from the electrical cabinet 40 a specific phase and respective neutral wire. For example, and without being limiting, the circuit breakers Sr, Ss and St, respectively feed the electric phase supply branches Rr, Rs and Rt. Each circuit breaker is wired to the same specific phase in each of the columns of sub-bus-bar elements {Bri, Bsi, Bti}. More particularly, the Rr circuit breaker feeding the "R" phase via the Sr circuit breaker is electrically connected by wires to the Br1 sub-bus-bar in the first column, to the Br2 sub-bus-bar in the second column, and to the Br3 sub-bus-bar in the third column. Similarly, the Rs circuit breaker feeding the "S" phase via the Ss circuit breaker is electrically connected by wires to the Bs1, Bs2 and Bs3 sub-bus-bar elements, and the Rt circuit breaker feeding the "T" phase via the St circuit breaker is electrically connected by wires to the Bt1, Bt2 and Bt3 sub-bus-bar elements. In this way, the electrical parallel connection of the sub-bus-bar elements associated with a specific electrical phase is established by wiring the sub-bus-bar elements to at least one circuit breaker branching out power supply of the specific phase.

As explained hereinabove, the electrical parallel connection of the sub-bus-bar elements associated with a specific electrical phase may be obtained through a self-protected electrical supply cable (as demonstrated in FIG. 3) electrically connected to the bus-bar system of the cabinet 40, by electrically connecting the respective sub-conductors of the cable to each other at a distal end of the cable.

The electrical phase provided from each circuit breaker Sr, Ss, St, . . . , Sx, may be delivered over a single phase wire together with a respective neutral wire Nr, Ns, Nt, . . . , Nx, electrically connected to the neutral bus-bar Bn.

In order to further improve the magnetic field attenuation the respective neutral wires Nr, Ns, Nt, . . . , Nx, are passed inside the electrical cabinet 40 substantially parallel to the respective circuit breaker Sr, Ss, St, . . . , Sx, associated with the specific phase wire to which they are accompanied. In this example, the neutral wires Nr, Ns, Nt, . . . , Nx, pass substantially parallel to the circuit breaker and to their respective phase wires and are located at the right side of the respective circuit breaker Sr, Ss, St, . . . , Sx. However, the exact location of the neutral wires Nr, Ns, Nt, . . . , Nx, relative to the circuit breaker Sr, Ss, St, . . . , Sx, may be different in other possible embodiments. For example, and without being limiting, the neutral wires may be placed on the left, front or back, side of their respective circuit breakers.

In some embodiments single-phase self-protected cables are used, instead of the conventional single-wire wires, for interconnecting between the various electrical components of the cabinet, and possibly also to distribute the electrical supply branching out from the cabinet. For example, and without being limiting, the electrical connectivity between the main circuit breaker (not shown) and the various sub-bus-bar elements, between the various sub-bus-bar elements and circuit breakers, and between the circuit breakers and any other circuitry/switching devices, may be carried out using self-protected cables, as described and claimed in International Patent Publication No. WO 2014/006622, which is incorporated herein by reference. The self-protected cables utilize a plurality of electrically insulated wires arranged in the cables in a predetermined configuration and electrical connectivity to improve the attenuation of the magnetic fields and thereby provide electrical cables that emanate substantially reduced magnetic fields.

In general, in possible embodiments, the conductors of the single-phase self-protected cables are arranged inside the cables on a circumference of a circle. Supporting elements may be provided inside the single-phase cables to guarantee that the position of the conductors does not shift (displace) inside the cable and thereby maintain their predetermined conductors arrangement with significant accuracy. In use, some of the conductors of the single-phase self-protected cables are electrically connected to each other in parallel and to one of the electrical phases of the cabinet, and some other conductors are separately electrically connected to each other in parallel and to the electrical neutral. In this electrical connection the conductors electrically connected to the electrical phase and the conductors electrically connected to the neutral are selected such that each conductor carrying the electrical phase of the cable is situated near at least one other conductor carrying the electrical neutral. For example, and without being limiting, the conductors may be selected such that each one of the conductors carrying the electrical phase is situated between two adjacent conductors carrying the electrical neutral.

Figure 5A:
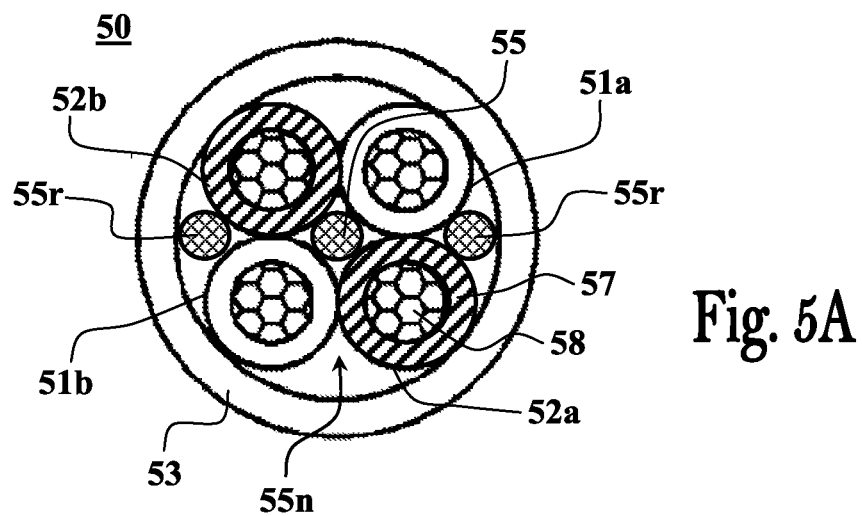
FIGS. 5A to 5C schematically illustrate possible configurations of single-phase cables having four conductors as may be used in the electrical cabinet according to some possible embodiments to reduce the magnetic fields, where

For example, and without being limiting, in some embodiments the electrical connectivity to the cabinet, and inside the cabinet, is carried out using single-phase self-protected cables 50 having four electrically insulated conductors 51a, 52a, 51b and 52b, arranged as illustrated in FIG. 5A. In this example, the electrical conductors 51a, 52a, 51b and 52b, are arranged in the cable 50 around a supporting element 55 in a rectangular form, where two conductors 51a and 51b are electrically connected to the electrical phase carried by the cable 50 and two other conductors 52a and 52b are electrically connected to the electrical neutral. In this arrangement, each one of the two conductors 51a and 51b electrically connected to the electrical phase of the cable 50 is situated between two other conductors 52a and 52b electrically connected to the electrical neutral of the cabinet.

The single-phase self-protected cable 50 may comprise one or more rip-cords 55r disposed between the jacket 53 (e.g., electrically insulating jacket such as Flame Retardant PVC jacket) and the electrical conductors of the cable 50. The rip-cords 55r may be placed under the jacket 53 along any of the outer channels 55n formed along the cable by adjacently situated conductors, and are used to facilitate the tearing of the jacket 53, whenever there is a need to remove a portion of the jacket 53. The rip-cords 55r may be further used to help to maintain the conductors in their locations inside the cable and prevent displacement of the conductors thereinside.

As seen in FIG. 5A the conductors in cable 50 comprise an electrically insulating cover 57, which in this example enclose a strand 58 of electrically conducting wires (e.g., flexible copper wires).

Figure 5B:
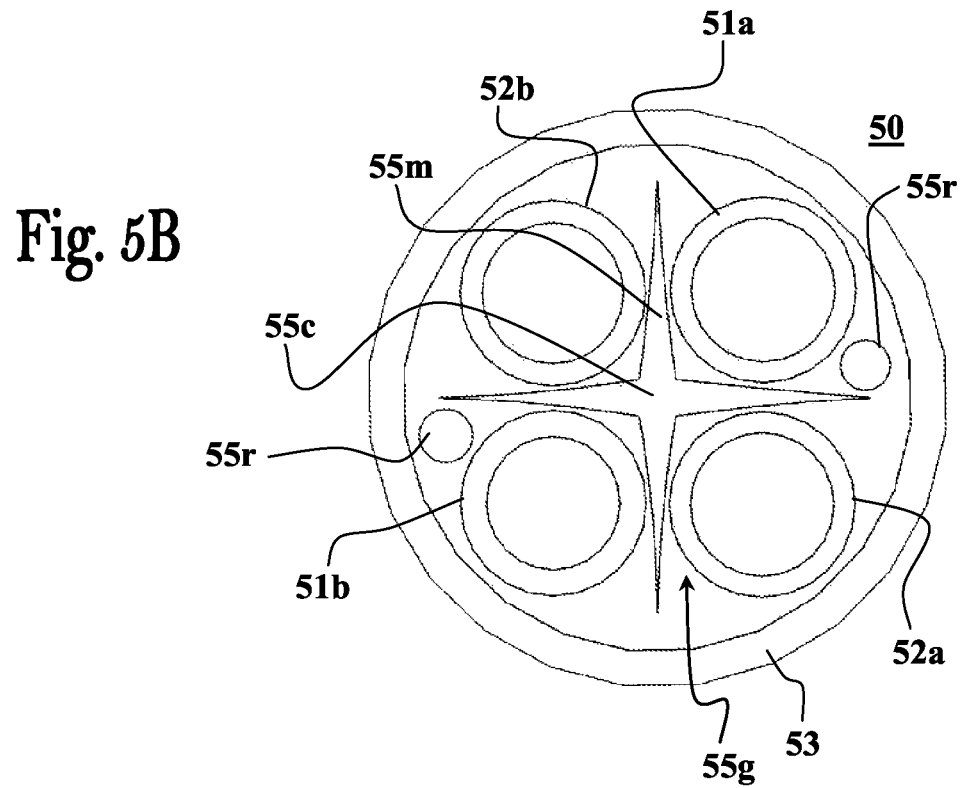

FIG. 5B exemplifies another possible embodiment wherein the sub-conductors 51a, 52a, 51b and 52b, are held inside the cable 50 by the arms 55m of an elongated cross-shaped supporting element 55c. More particularly, in this embodiment each pair of adjacent elongated arms of the elongated cross-shaped supporting element 55c defines an elongated groove 55g configured to hold and immobilize one of the sub-conductors 51a, 52a, 51b and 52b, therein. The arms 55m of the cross-shaped supporting element 55c may taper in a radial outward direction towards the jacket 53 of the cable 50, to thereby improve the flexibility of the cable 50.

Figure 5C:
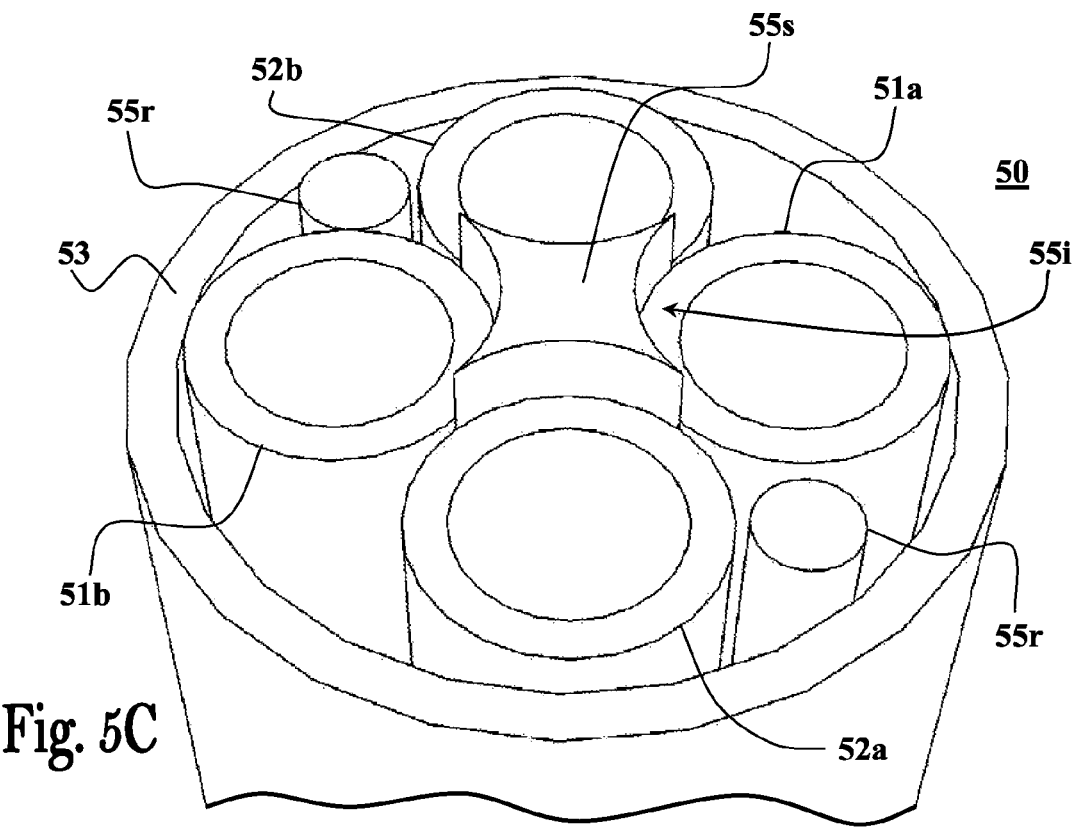

FIG. 5C shows a possible embodiment of cable 50 wherein the conductors 51a, 52a, 51b and 52b, of the cable are held in circular indentations 55i of an elongated supporting element 55s having a four apex star shape. As seen, with this configuration the locations and geometrical arrangement of the sub-conductors 51a, 52a, 51b and 52b, can be accurately maintained since the conductors 51a, 52a, 51b and 52b, are pressed by the jacket 53 into the circular indentations 55i of the star-shaped supporting element 55s, and thereby prevent any movement of the conductors inside the cable 50. The single-phase self-protected cables 50 shown in FIGS. 5A to 5C may also include rip-cords 55r, disposed between the sub-conductors and the jackets of the cables. The supporting elements 55, 55c and 55s, shown in FIGS. 5A to 5C, may be fabricated from a suitable soft material (e.g., FR-LSZH, Flame Retardant Low Smoke Zero Halogen, FR-PVC, FR-PE), for example, by extrusion.

Figure 6A:
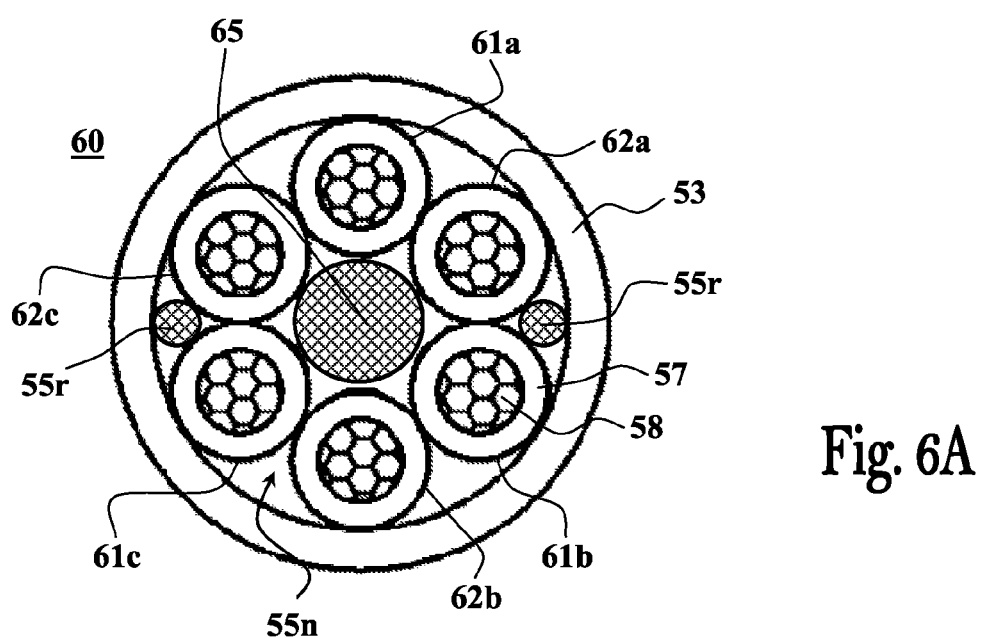
FIGS. 6A to 6C schematically illustrate possible configurations of single-phase cables having six conductors as may be used in the electrical cabinet according to some possible embodiments to reduce the magnetic fields, where
Figure 6B:
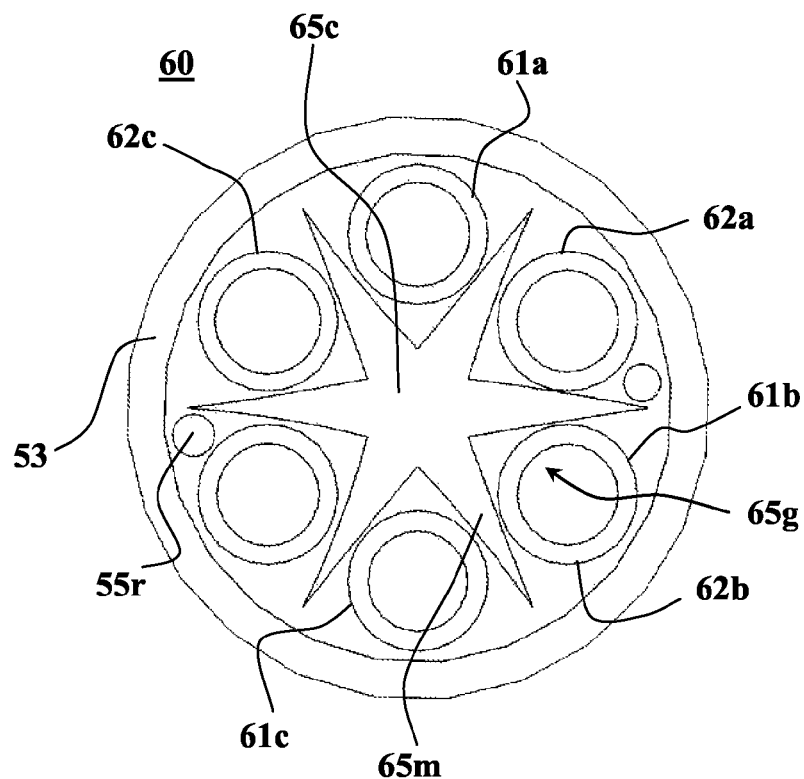
Figure 6C:
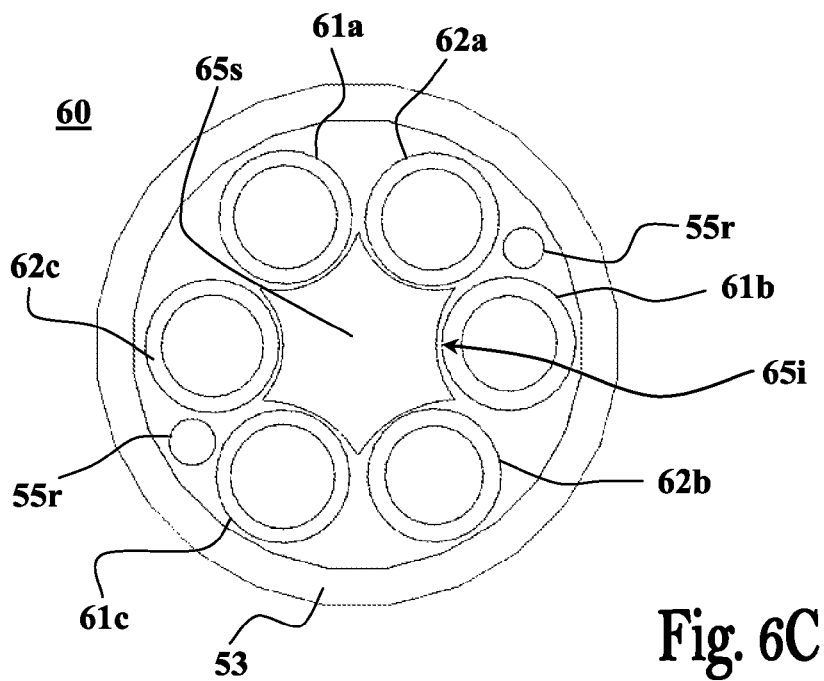

FIGS. 6A to 6C schematically illustrate a single-phase self-protected cable 60 according to some possible embodiments comprising six electrically insulated sub-conductors 61a, 62a, 61b, 62b, 61c and 62c. The sub-conductors in the cable 60 are arranged in a circular form around a central supporting element 65 that prevents displacement of the sub-conductors inside the cable 60 and guarantees that the geometrical arrangement of the sub-conductors remains unchanged thereinside. The supporting element 65 of single-phase cable 60 shown in FIG. 6A has a circular cross-sectional shape and its diameter substantially equals to a diameter of the sub-conductors 61a, 62a, 61b, 62b, 61c and 62c. In this way, each one of the sub-conductors is pressed by the jacket 53 of the cable against the supporting element 65 while simultaneously being laterally pressed by the two adjacently located sub-conductors, thereby preventing movement and substantially immobilizing the sub-conductors inside the cable 60.

In use, three of the sub-conductors (e.g., 61a, 61b and 61c) of the single-phase cable 60 are electrically connected in parallel to each other and to an electric phase of the cable, while the other three sub-conductors (e.g., 62a, 62b and 62c) are separately electrically connected to each other in parallel and to the electric neutral. The sub-conductors connected to the electric phase and neutral are selected such that each one of the sub-conductors that carries the electric phase is situated inside the cable 60 between two other sub-conductors connected to the electric neutral.

FIG. 6B schematically illustrates a possible embodiment of a single-phase cable 60 in which the sub-conductors 61a, 62a, 61b, 62b, 61c and 62c are held in elongated grooves 65g of a six-point asterix-shaped supporting element 65c. More particularly, in this embodiment each pair of adjacent elongated arms 65m of the elongated asterix-shaped supporting element 65c defines an elongated groove 65g capable of holding and immobilizing one of the sub-conductors 61a, 62a, 61b, 62b, 61c and 62c, therein, as it is being pressed by the jacket 53 against the pair of arms between which the elongated groove 65g is confined. As seen in FIG. 6B, the arms 65m of the supporting element 65c may taper in a radial outward direction towards the jacket 53 of the cable 60, to thereby improve the flexibility of the cable 60.

FIG. 6C schematically illustrates a possible embodiment of a single-phase cable 60 wherein the sub-conductors 61a, 62a, 61b, 62b, 61c and 62c are held in elongated circular indentations 65i of a six-apex star-shaped supporting element 65s. This configuration guarantees that the position of the conductors 61a, 62a, 61b, 62b, 61c and 62c, remain unchanged inside the cable 60, as the external jacket 53 of the cable presses the conductors against the respective indentations 65i in which they are retained.

The single-phase self-protected cables 60 shown in FIGS. 6A to 6C may further comprise one or more rip-cords 55r placed under the jacket 53 along elongated channels 55n formed inside the cable therealong by adjacently situated conductors. As explained above, the rip-cords 55r facilitate the tearing of the jacket 53, whenever there is a need to remove a portion of the jacket 53, and may be further employed to restrain the sub-conductors thereinside and prevent them from moving under the jacket 53. For example, and without being limiting, the rip-cords 55r may be made from a type of Aramid, KEVLAR or any other suitable strength member material.

It is noted that the supporting elements employed in the self-protective cables of the present invention may be implemented in various forms and shapes, and are not limited to the examples shown in FIGS. 5A-5C and 6A-6C. For example, and without being limiting, the supporting elements may be implemented by one or more elongated flat elements interposed in the cables between the sub-conductors, or by any suitable filler material that can be introduced into the cable and maintain the desired structure of the sub-conductors arrangement thereinside. It is further noted that the use of such supporting elements to hold and immobilize the sub-conductors inside the cables substantially improves the accuracy of the sub-conductors arrangement structure and consequently further improves the immunity of the cables to external interfering magnetic fields and substantially attenuate the magnetic field emanating from the cables. The supporting elements used in the cables 50 and 60 may be fabricated from a suitable polymer compound (e.g. PE, FR-LSZH), for example, by extrusion.

In some embodiments the electrically insulating material used for the covers 57 of the conductors is selected to assure substantially low cable capacitance values (e.g., Crosslinked polyethylene—XLPE). The use of such low capacitance assuring cover materials in combination with the arrangement of the conductors in the magnetic-field-attenuating structures of the present invention provides cables having substantially low and constant capacitance and inductance. This properties of the cable guarantee good transfer of low-frequency signals (i.e., due to low capacitance), while also guaranteeing good transfer of high frequency signals (i.e., due to low inductance) substantially without distortions and delays.

As discussed hereinabove, the single-phase cables of the present invention may advantageously replace the single-wire wires commonly used in electrical cabinets, to thereby reduce the magnetic fields produced by the cabinet. For example, and without being limiting, the single phase cables may be used for the phase supply branches Rr, Rs and Rt, branching out from the electrical cabinet 40. Table 1 presents specifications of various single-phase cables that may be used to replace standard single-wire wires commonly used for specific loads—

TABLE 1

| Number of conductors | Conductors cross-sectional area (mm$^2$) | Conductors cross-sectional area of standard single-wire equivalent (mm$^2$) |
|---|---|---|
| 4 | 0.75 | 1.5 |
| 4 | 1.25 | 2.5 |
| 4 | 2 | 4 |
| 6 | 2 | 6 |

Figure 7:
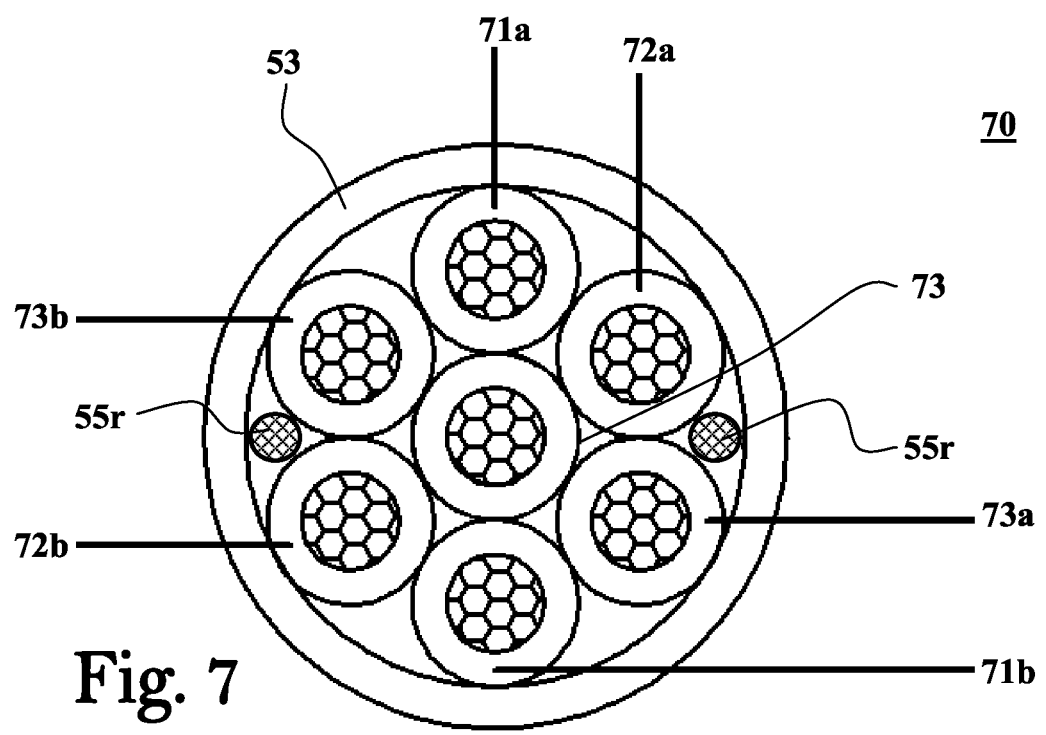
FIG. 7 schematically illustrates a possible configuration of a three-phase cable comprising seven conductors, as may be used in some possible embodiments.

FIG. 7 schematically illustrates a three-phase cable 70 comprising seven electrically insulated conductors, which may be used to supply electric power to the cabinet according to some possible embodiments. In this embodiment six of the electrical conductors of the cable 70 are arranged in a circular form around the seventh conductor 73 which is employed as the electric neutral of the cable 70. In this example, two conductors, 71a and 71b, of the cable 70 are electrically connected to each other in parallel and to a first phase of the cable 70, two other conductors, 72a and 72b, of the cable 70 are separately electrically connected to each other in parallel and to a second phase of the cable 70, and the last two conductors, 73a and 73b, of the cable 70 are electrically connected to each other in parallel and to a third phase of the cable 70. This configuration of the conductors of the cable guarantees that the magnetic fields emanating from the conductors destructively interfere with each other and thus significantly attenuate the magnetic field produced by the cable 70.

In some embodiments, however, as exemplified hereinabove with reference to FIG. 3A, the conductors associated with a specific phase are directly connected to each only at the remote end (relative to the cabinet) of the cable, and each conductor at the other end is connected to a respective sub-bus bar element. In this way the parallel electrical connection of the conductors of the cable is obtained through the sub-bus bar elements of the cabinet.

As exemplified hereinabove the three-phase cables of the present invention may replace the standard three-phase cables used nowadays in electrical cabinets by suitable adaptation of the conductors' properties and specifications. Table 2 presents specifications of various three-phase cables designs of the present invention suitable for use in electrical cabinets, and in other applications as well.

TABLE 2

| Number of conductors | Conductors cross-sectional area (mm$^2$) | Conductors cross-sectional area of standard equivalent |
|---|---|---|
| 1 + 6 | 1 × 1.5 + 6 × 0.75 | 4 × 1.5 |
| 1 + 6 | 1 × 2.5 + 6 × 1.25 | 4 × 2.5 |
| 1 + 6 | 1 × 4.0 + 6 × 2.0 | 4 × 4 |
| 1 + 6 | 1 × 6.0 + 6 × 3.0 | 4 × 6 |
| 1 + 6 | 1 × 10.0 + 6 × 5.0 | 4 × 10 |

EXAMPLE

Magnetic field emanating from a conventional electrical cabinet and from an electrical cabinet designed as exemplified in FIG. 4 (also referred to herein as modified cabinet) were taken using EMF-827 tester (Lutron Electronic Enterprise Ltd, Taiwan). All measurements were taken by positioning the tester sensor at a distance of 20 cm from the examined electrical cabinet at the following measurements sites:

a) Center of the bus-bar system;
b) At midpoint length of power supply cable channel; and
c) Mid-height of the switchgear tray.

All measurements were taken for a single phase and three-phase loads at the following locations of the measurements sites: at the right side of the electrical cabinet, perpendicular to the electrical cabinet in front (opening side), and at the left side of the electrical cabinet.

The results provided in table 3 presents a computed average of measurements obtained for each location site at the three locations indicated above.

TABLE 3

(measured results in milligauss)

| Measurement site | Conventional cabinet and single phase load | Conventional cabinet and three-phase load | Modified cabinet and single phase load | Modified cabinet and three phase load |
|---|---|---|---|---|
| a | 13 | 3 | 3 | 0.5 |
| b | 10 | 2 | 1.1 | 0.2 |
| c | 1.5 | 1 | 0.3 | 0.5 |

The results in Table 3 show that the magnetic field emanating from electrical cabinets can be effectively reduced with the modified cabinet arrangements of the present application.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A bus-bar system for distributing electrical power of an electrical supply comprising two or more conductors, the bus-bar system comprising:
   two or more bus-bar elements each electrically connectable to at least a respective one of the conductors of said electrical supply;
   groups of at least two sub-bus-bar elements including a plurality of groups, each of the bus-bar elements being formed by a respective one of the groups of the at least two sub-bus-bar elements electrically connectable to each other in parallel, each of the groups of the subbus-bar elements being electrically connectable to the at least one of the conductors of said electrical supply, said sub-bus-bar elements being arranged in a spaced apart parallel relationship in parallel spaced apart geometrical planes, such that each of said sub-bus-bar elements in each of the groups is located only adjacent to one or more of said sub-bus-bar elements in any other of the groups, and each of said sub-bus-bar elements in each of the groups is associated either with (i) with an electrical phase that is different from an electrical phase of each of said sub-bus-bar elements in the any other of the groups, or (ii) with an electrical current direction that is different from an electrical current direction of each of said sub-bus-bar elements in the any other of the groups, to thereby cause magnetic fields emanating from said sub-bus-bar elements to destructively interfere with each other, wherein the sub-bus-bar elements are arranged in parallel columns, each of said columns being situated in one of the parallel geometrical planes, and wherein said sub-bus-bar elements are arranged in said columns in a spaced apart substantially parallel relationship along axes of said parallel columns, and wherein at least one of the sub-bus-bar elements in any one of the columns is aligned with a gap between two neighboring ones of the sub-bus-bar elements in an adjacently located one of the columns.

2. The bus-bar system according to claim 1, wherein the sub-bus-bar elements are made from elongated electrically conducting pieces geometrically arranged in parallel.

3. The bus-bar system according to claim 1 wherein the sub-bus-bar elements are arranged such that each one of the columns comprises a single sub-bus-bar element from each of the groups of the sub-bus-bar elements.

4. The bus-bar system according to claim 1 wherein a distance between two adjacently located ones of the columns is equal to, or smaller than, a phase to phase distance of the bus-bar system.

5. The bus-bar system according to claim 1 wherein an arrangement of the sub-bus-bar elements in each column is shifted along the axis of a respective one of the columns relative to an arrangement of the sub-bus-bar elements in at least one adjacently located one of the columns.

6. The bus-bar system according to claim 1 wherein the sub-bus-bar elements being electrically connectable to each other in parallel in the respective one of the groups is achieved via the electrical supply.

7. A bus-bar system for distributing electrical power supply configured to supply at least two different electrical phases, the bus-bar system comprising:
two or more bus-bar elements each associated with a specific electrical phase of the at least two different electrical phases of said electrical supply;
groups of sub-bus-bar elements, each of the bus-bar elements being formed by a respective one of the groups of the sub-bus-bar elements comprising at least two of the sub-bus-bar elements electrically connectable to each other in parallel, each of the groups of the sub-bus-bar elements being associated with the specific electrical phase of said electrical supply that is different from an electrical phase associated with any other group of said sub-bus-bar elements,
said sub-bus-bar elements being arranged in parallel columns situated in parallel geometrical planes such that said sub-bus-bar elements are substantially parallel to each other, and such that each of said sub-bus-bar elements in the respective one of the groups is electrically associated with the specific phase of the electrical phases of said electrical supply is located only adjacent to one or more of the sub-bus-bar elements in at least another one of the groups, each of which is associated with an electrical phase that is different from the specific phase of the electrical phases of said sub-bus-bar element, to thereby cause magnetic fields emanating from said sub-bus-bar elements to destructively interfere with each other, and wherein at least one of said sub-bus-bar elements in any one of the columns is aligned with a gap between two neighboring ones of said sub-bus-bar elements in an adjacently located one of the columns.

8. The bus-bar system according to claim 7, wherein the sub-bus-bar elements are arranged such that each one of the columns comprises a single one of said sub-bus-bar elements from each of the groups of said sub-bus-bar elements.

9. The bus-bar system according to claim 7 wherein an order of the at least two different electrical phases in each column is cyclically shifted relative to an order of the at least two different electrical phases in at least one adjacently located one of the columns of said sub-bus-bar elements.

10. The bus-bar system according to claim 7 wherein an arrangement of the sub-bus-bar elements in each column is shifted along an axis of a respective one of the columns relative to the arrangement of the sub-bus-bar elements in at least one adjacently located one of the columns.

11. The bus-bar system according to claim 7 wherein the electrical supply is provided by a cable, and wherein the sub-bus-bar elements being electrically connectable to each other in parallel is achieved via said cable.

12. An electrical cabinet comprising:
a bus-bar system for distributing electrical power supplied by a three-phase electrical supply, said bus-bar system comprising three bus-bar elements each associated with a respective electrical phase of said three-phase electrical supply, groups of sub-bus-bar elements, each one of said bus-bar elements being in the form of a respective one of the groups of at least two of said sub-bus-bar elements electrically connectable to each other in parallel, each of the groups of the sub-bus-bar elements being associated with a phase of said three-phase electrical supply, said sub-bus-bar elements being arranged in a spaced apart parallel relationship in spaced apart parallel geometrical planes such that each one of said sub-bus-bar elements in the respective one of the groups is situated only adjacent to one or more of the sub-bus-bar elements in at least another one of the groups associated with an electrical phase different from the respective electrical phase of said sub-bus-bar element,
wherein the sub-bus-bar elements are arranged in parallel columns, each of said columns being situated in one of the parallel geometrical planes, and
wherein said sub-bus-bar elements are arranged in said columns in a spaced apart substantially parallel relationship along axes of said parallel columns, and
wherein at least one of the sub-bus-bar elements in any one of the columns is aligned with a gap between two neighboring ones of the sub-bus-bar elements in an adjacently located one of the columns.

13. The electrical cabinet according to claim 12 further comprising one or more neutral bus-bar or sub-bus-bar elements.

14. The electrical cabinet according to claim 12 wherein electrical connectivity in the electrical cabinet is carried out by single-phase cables, each of the single-phase cables carrying a single phase of the three-phase electrical supply and comprising a plurality of conductors, a predetermined number of said conductors used for carrying a single electric phase of the three-phase electrical supply and another predetermined number of said conductors used for carrying an electric neutral, said conductors being arranged in each of said cables such that magnetic fields emanating from the conductors destructively interfere with each other.

15. The electrical cabinet according to claim 14, wherein the conductors used for carrying the single electric phase are electrically connected to each other in parallel, the conductors used for carrying the electric neutral are electrically connected to each other in parallel, and wherein each of the conductors used for carrying the single electric phase is located inside each of said single-phase cables adjacent to at least one of the conductors used for carrying the electric neutral.

16. The electrical cabinet according to claim 14 wherein each of the single-phase cables comprises a central supporting member and the conductors of each of the cables are arranged in a circular form around said central supporting member, said central supporting member being configured and operable to maintain the conductors in fixed locations in each of the cables and prevent displacement of the conductors thereinside.

17. The electrical cabinet according to claim 16 wherein the central supporting element is an elongated element having a multipoint cross-sectional star or asterisk shape configured to define a predetermined number of indentations, each configured to receive and hold one of the conductors of each of the cables.

18. The electrical cabinet according to claim 14, wherein the conductors are arranged in each of the single-phase cables such that each of the phase carrying conductors is situated adjacent to at least one of the neutral carrying conductors.

19. A method of reducing magnetic fields emanating from a multi-phase electrical cabinet utilizing a bus-bar system, comprising:

providing a plurality of sub-bus-bar elements, each of the bus-bar elements of the bus-bar system carrying one of multiple electric supply phases and in a form of a group of two or more of said sub-bus-bar elements, and associating each group of said sub-bus-bar elements with the one of the multiple electrical supply phases that is different from any other of the multiple electrical supply phases associated with any other group of the sub-bus-bar elements;

arranging the sub-bus-bar elements in parallel spaced apart geometrical planes such that each one of the sub-bus-bar elements belonging to one group of the sub-bus-bar elements is situated only adjacent to one or more sub-bus-bar elements having a different electrical supply phase than an electrical supply phase of the one group of the sub-bus-bar elements; and establishing parallel electrical connection between said two or more sub-bus-bar elements in each respective group of sub-bus-bar elements, wherein the arranging comprises arranging the sub-bus-bar elements in parallel columns in a spaced apart substantially parallel relationship along axes of the columns, each of said columns being situated in one of the parallel geometrical planes, and aligning at least one of the sub-bus-bar elements in any one of the columns with a gap between two neighboring ones of the sub-bus-bar elements in an adjacently located one of the columns.

20. The method of claim 19, wherein the arranging comprises cyclically shifting an order of the multiple electrical supply phases in each of the columns of the bus-bar elements relative to an order of the multiple electrical supply phases in at least one adjacently located one of the columns of the bus-bar elements.

21. The method of claim 19, wherein the arranging comprises shifting said sub-bus-bar elements in at least one of the columns along an axis of the at least one of the columns relative to said sub-bus-bar elements of an adjacently located one of the columns.

* * * * *